United States Patent
Bicego et al.

(10) Patent No.: US 7,454,352 B2
(45) Date of Patent: Nov. 18, 2008

(54) METHOD AND SYSTEM FOR ELIMINATING REDUNDANT VOICE RECOGNITION FEEDBACK

(75) Inventors: James E. Bicego, Lake Orion, MI (US); Anthony J. Sumcad, Southfield, MI (US); Russell A. Patenaude, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 522 days.

(21) Appl. No.: 11/133,773

(22) Filed: May 20, 2005

(65) Prior Publication Data

US 2006/0265217 A1 Nov. 23, 2006

(51) Int. Cl.
*G10L 21/00* (2006.01)

(52) U.S. Cl. .................. 704/275; 704/270; 704/270.1
(58) Field of Classification Search .............. 704/275, 704/231, 236, 240, 270, 270.1, 9, 257, 251
See application file for complete search history.

(56) References Cited

U.S. PATENT DOCUMENTS 6,415,257 B1 * 7/2002 Junqua et al. ............... 704/275
6,697,782 B1 * 2/2004 Iso-Sipila et al. ........... 704/275

* cited by examiner

*Primary Examiner*—Huyen X. Vo

(57) ABSTRACT

A method and system for eliminating redundant voice recognition feedback includes receiving a voice command input at a command processor and determining a feedback requirement. The method further provides a voice command feedback based on the feedback requirement. A computer usable medium with suitable computer program code is provided for eliminating redundant voice recognition feedback.

15 Claims, 4 Drawing Sheets

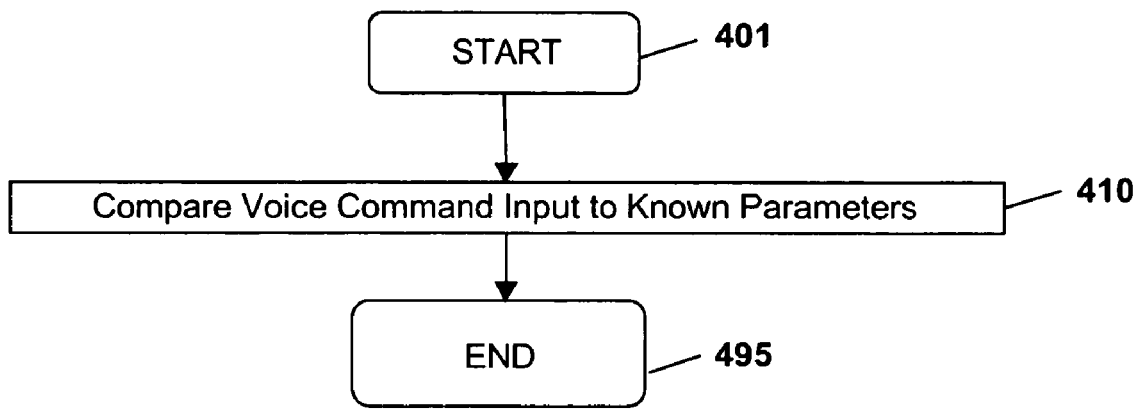
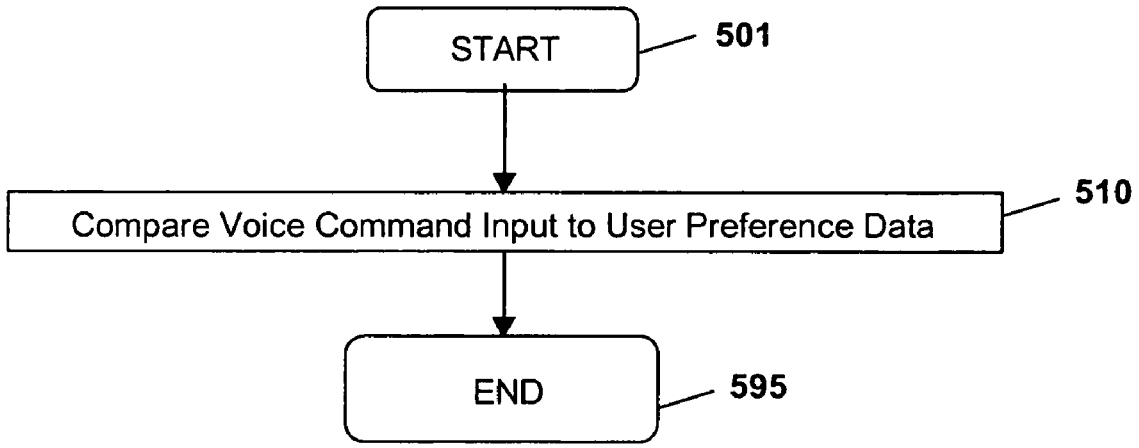

METHOD AND SYSTEM FOR ELIMINATING REDUNDANT VOICE RECOGNITION FEEDBACK

FIELD OF THE INVENTION

This invention relates generally to voice recognition systems. In particular the invention relates to eliminating redundant voice recognition feedback.

BACKGROUND OF THE INVENTION

Voice recognition systems are a common feature in telematics equipped mobile vehicles. A voice recognition system is used to receive spoken commands for operating various systems within the vehicle. Voice recognition systems provide synthesized voice feedback for the commands received by the system. One such command is a phone number to be dialed. For example, a user requests "dial 313-555-1212" and the system responds "dialing 313-555-1212." If the system is heavily utilized, the voice recognition feedback may be redundant. One such feedback may include phone numbers.

Redundant voice recognition feedback is often undesirable or annoying for the user. Voice recognition systems do not allow for correction of erroneous requests without canceling and repeating the command. In addition, voice recognition systems cannot provide feature reminders and context sensitive feedback nor allow feedback to be customized to the system user. In another example, if a list of phone numbers is added to an address book, repetition of the phone numbers may be redundant.

It is therefore desirable to provide a method and system for eliminating redundant voice recognition feedback that overcomes the limitations, challenges, and obstacles described above.

SUMMARY OF THE INVENTION

One aspect of the present invention provides a method for eliminating redundant voice recognition feedback comprising receiving a voice command input at a command processor, determining a feedback requirement; and providing a voice command feedback based on the feedback requirement.

Another aspect of the present invention provides a system for eliminating redundant voice recognition feedback comprising means for receiving a voice command input at a command processor, means for determining a feedback requirement; and means for providing a voice command feedback based on the feedback requirement.

A third aspect of the present invention provides a computer readable medium storing a computer program including computer readable code for eliminating redundant voice recognition feedback comprising computer program code for receiving a voice command input at a command processor, computer program code for determining a feedback requirement; and computer program code for providing a voice command feedback based on the feedback requirement.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 illustrates a second flowchart of the step of determining a voice feedback requirement in accordance with one embodiment of the present invention; and FIG. 5 illustrates a third flowchart of the step of determining a voice feedback requirement in accordance with one embodiment of the present invention.

DETAILED DESCRIPTION OF THE PRESENTLY PREFERRED EMBODIMENTS

Figure 1:
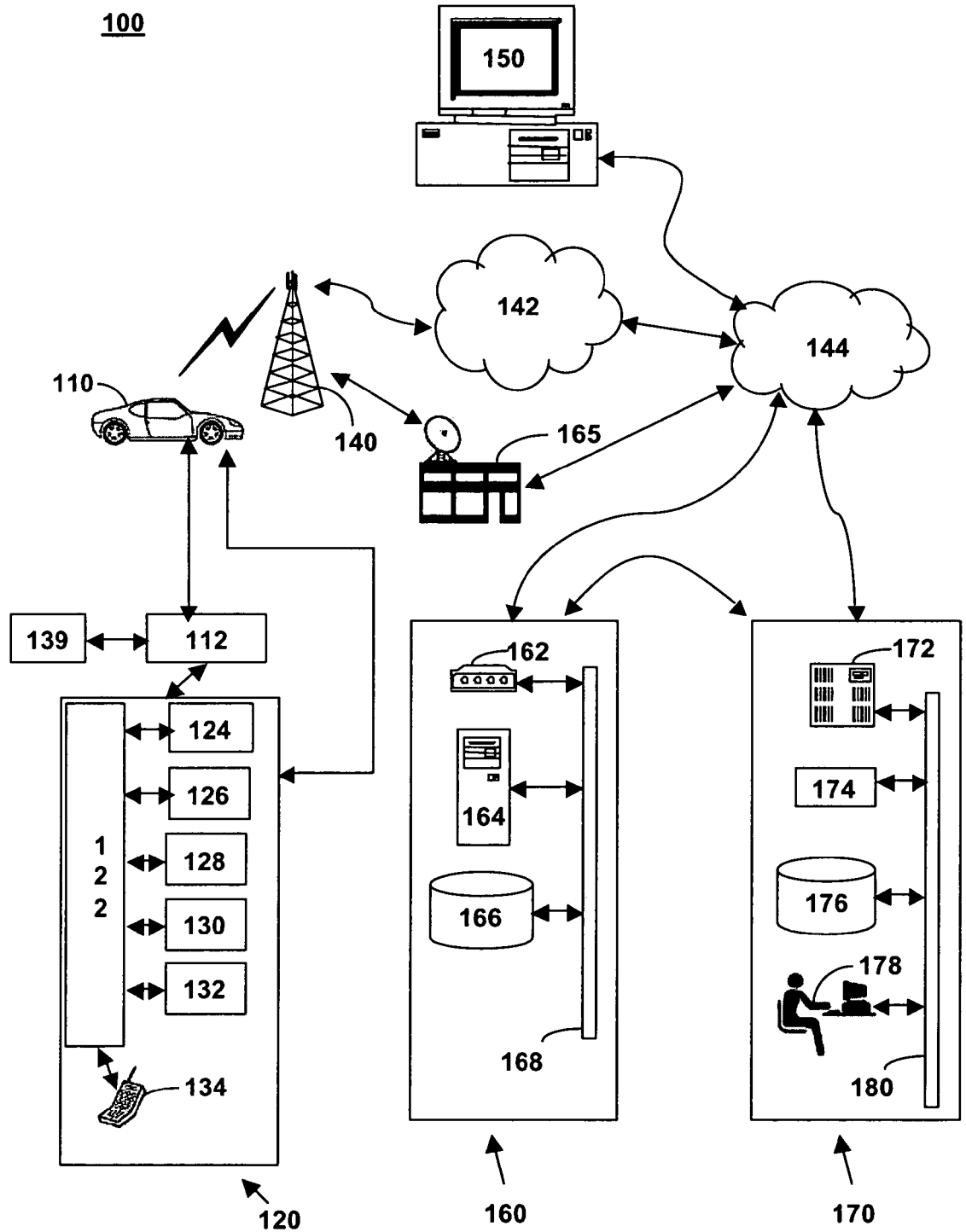
FIG. 1 illustrates one embodiment of a system for eliminating redundant voice recognition feedback, in accordance with the present invention.

FIG. 1 illustrates one embodiment of a system for eliminating redundant voice recognition feedback, in accordance with the present invention at 100. The redundant feedback elimination system includes a mobile vehicle communication unit (MVCU) 110, a vehicle communication network 112, one or more embedded modules 139, a command processor such as a telematics unit 120, one or more wireless carrier systems 140, one or more communication networks 142, one or more land networks 144, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. In one embodiment, a display such as a dialed digital display in a radio unit or in an instrument panel is embedded in MVCU 110. In other embodiments, MVCS 100 includes additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 is implemented without one or more of the above listed components such as, for example, GPS unit 126 or speakers 132 or includes additional components not relevant to the present discussion.

In one embodiment, processor 122 is implemented as a microcontroller, microprocessor, digital signal processor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170.

A voice-recognition application is installed in processor 122 that can translate human voice command input through microphone 130 to digital signals. Processor 122 generates and accepts digital signals transmitted between telematics unit 120 and a vehicle communication network 112 that is connected to various embedded modules 139 in the vehicle. In one embodiment, these digital signals activate the programming mode and operation modes, as well as provide for data transfers. In another embodiment, signals from processor 122 are translated into voice messages and sent out through speaker 132. Voice messages include voice recognition feedback for voice command input. Voice recognition feedback provides confirmation of voice command input received at the telematics unit. The voice recognition feedback can be turned on, turned on, or the redundancy mode described herein can be enabled. Redundancy mode allows the system to eliminate some voice recognition feedback based on certain pre-established and user-configurable conditions.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. In one embodiment, modem 162 resides inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a test center facilitating communications to mobile vehicle 110 for testing of embedded modules 139. In another embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. In one embodiment, communication services manager 174 includes at least one analog and/or digital modem.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative embodiment, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

Figure 2:
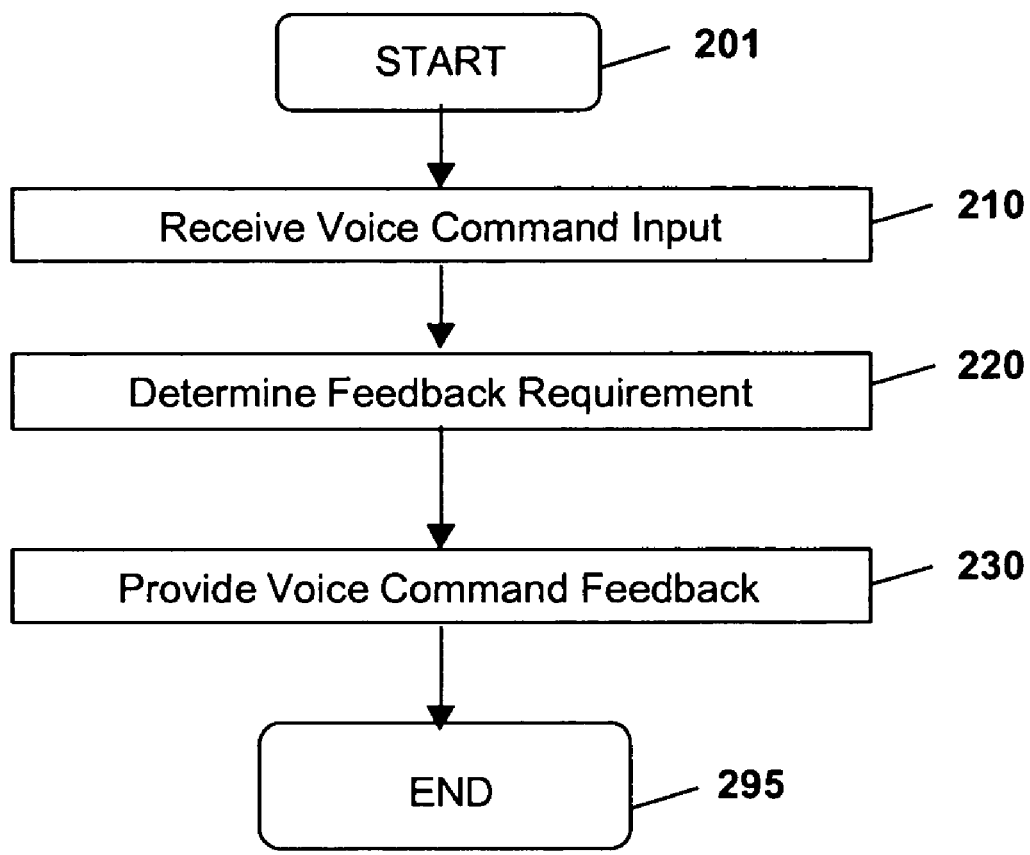
FIG. 2 illustrates a flowchart representative of one embodiment of a method for eliminating redundant voice recognition feedback, in accordance with the present invention.

FIG. 2 illustrates a flowchart 200 representative of one embodiment of a method for eliminating redundant voice recognition feedback, in accordance with the present invention. The method begins at 201.

During step 210, a voice command input is received at telematics unit 120. Voice command input is received through microphone 130 of telematics unit 120. Voice command input includes any command or data that is recognized by the voice recognition system of the telematics unit. Examples include a user request to dial a phone number, a user request to activate an audio feature, or a user request to locate a particular address.

During step 220, a feedback requirement is determined at telematics unit 120. The feedback requirement indicates the type and amount of voice command feedback, if any, that is provided to a user of the voice recognition system of the telematics unit. The feedback requirement is determined either by a single method or by a combination of methods. Methods for determining the feedback requirement and examples of those methods are discussed in FIGS. 3, 4 and 5.

During step 230, a voice command feedback is provided based on the feedback requirement determined in step 220. Voice command feedback, includes repeating the received voice command input, requesting clarification of the received voice command input, and prompting for user action based on the received voice command input.

In one embodiment, the voice command feedback includes a nametag storage message. Nametag entries are phone numbers stored in the telematics unit with an associated text string. The nametag storage message prompts the user to create a nametag for a phone number if that phone number is dialed repeatedly and does not match a current nametag entry.

In another embodiment, the phone number dialed matches a number stored as a nametag. The telematics unit uses this information to send voice command feedback that includes a reminder that the number is stored as a nametag. The telematics unit can also use the nametag to modify the voice command input. If the voice command input closely matches a stored nametag, the system can use the nametag to presume that the user intended to dial the number associated with that nametag. Voice command feedback can query the user whether they intended to dial the phone number associated with the nametag or can inform the user that it is dialing the phone number associated with the nametag. Method 200 terminates during step 295.

Figure 3:
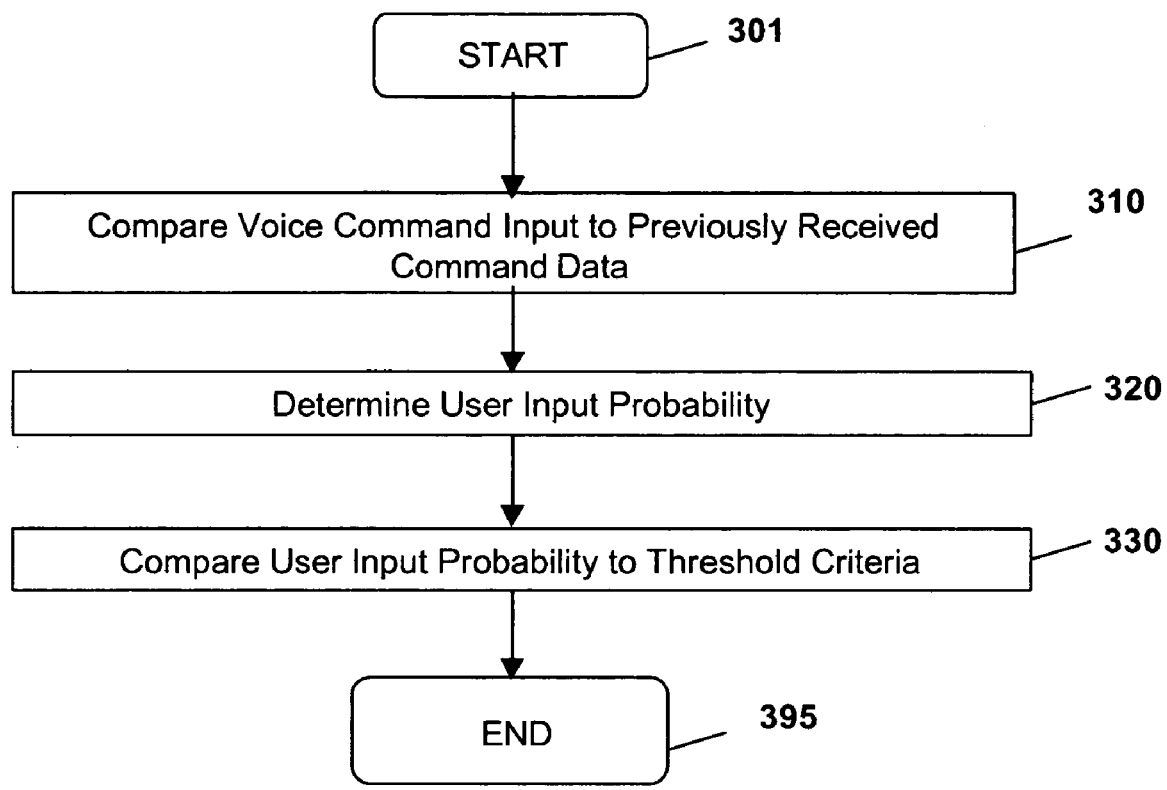
FIG. 3 illustrates a first flowchart of the step of determining a voice feedback requirement in accordance with one embodiment of the present invention.

FIG. 3 illustrates a flowchart 300 of the step of determining a voice feedback requirement at the telematics unit 120 at 220 of FIG. 2 in accordance with one embodiment of the present invention. In this embodiment, the telematics unit establishes a user input probability to determine the feedback requirement. The step detail begins at step 301.

During step 310, the voice command input is compared to previously received command data stored in the telematics unit 120. When voice command input is received at a telematics unit 120, it is stored in memory 128. Subsequently received voice command input is compared to the stored previously received command data to identify any similarities between the voice command input and the stored data. The comparison examines the frequency with which the identical voice command input has been received and the degree of correspondence between the voice command input and previously received command data.

During step 320, a user input probability is determined. The user input probability is determined based on the comparison of the voice command input to previously received command data stored in the telematics unit, from step 310. Where the voice command input is a request to dial a phone number, the comparison results in a count of the times the phone number was requested previously and a count of the number of digits in the requested phone number that sequentially match all previously dialed phone numbers. In an example, the telematics unit receives voice command input requesting it dial 313-555-1212. The telematics unit determines that the requested phone number was dialed on ten previous occasions and that the requested phone number matches six of ten digits in all other previously dialed numbers. This data comprises the user input probability.

Data rules specify how the voice command input is processed, at the telematics unit, to determine the user input probability. The data rules are predefined but are customizable by the user. In the above example, the predefined data rules specify that the system provide a count of the number of times a phone number has been dialed and a count of the number of digits that sequentially match the digits in all previously dialed phone numbers.

During step 330, the user input probability is compared to threshold criteria. If the input probability exceeds the threshold criteria, the telematics unit determines that the user intended the received command input as spoken and the feedback requirement is that voice feedback is unnecessary. In the example above, if the threshold criteria are that phone number was dialed more than nine times and that it matches at least six digits sequentially then the input probability exceeds the threshold criteria. The threshold criteria can be pre-defined or can vary based on user preference. Method 300 ends at step 395.

FIG. 4 illustrates a flowchart 400 of the step of determining a voice feedback requirement at the telematics unit 120 at 220 of FIG. 2 in accordance with one embodiment of the present invention. In this embodiment, the telematics unit uses known parameters to determine the voice feedback requirement. The step detail begins at step 401.

During step 410, the voice command input is compared to known parameters either stored in or ascertained by telematics unit 120. Known parameters include, but are not limited to, the MIN associated with the telematics unit 120, the current area code in which the telematics unit is located, frequently used area codes, saved local phone numbers, stored nametags, and a subscriber's personal identification number or password. If the voice command input coincides with the known parameters, then the feedback requirement is that voice command feedback is not required or can be truncated. Known parameters are saved in a lookup table stored in the telematics unit.

In a first example, the voice command input corresponds to a local number stored in the lookup table. Since the number is stored in the lookup table, no voice command feedback is required. In a second example, the voice command input is a phone number having an area code that matches the MIN of the telematics unit. In this case, the voice command feedback will not include the area code of the phone number requested.

In one embodiment, the voice command input is modified based on the feedback requirement. This feature allows the telematics unit to self-correct voice command input. In an example, a voice command that includes a phone number to be dialed is entered. The format of the phone number is ten digits and the first three digits do not represent a valid area code. The phone number is modified as the system attempts to self-correct the phone number. The modification can be based on the current area code in which the system is located, the area code of the system's MIN, or a previously dialed number that closely matches the one entered. In one embodiment, the user is notified with voice command feedback that that the number has been modified. During step 495, the flow of flowchart 400 is terminated.

FIG. 5 illustrates a flowchart 500 of the step of determining a voice feedback requirement at the telematics unit 120 at 220 of FIG. 2 in accordance with one embodiment of the present invention. In this embodiment, the telematics unit employs user preference data to determine the voice feedback requirement. The step detail begins at step 501.

During step 510, the voice command input is compared to user preference data stored in telematics unit 120. In one example, user preference data specifies whether voice command feedback is on, off, or in redundancy mode. In a second example, user preference data includes user defined data rules instructing the telematics unit what conditions must be met before user command feedback is given. In a third example, user preference data instructs the telematics unit to ignore nametags and to not generate nametag storage messages.

In one embodiment user preference data specifies additional parameters for voice recognition feedback such as the volume, pitch, speed, language, or delay of voice command feedback and whether the voice command feedback is routed to a visual display. The visual display is available in addition to or instead of the audio display. Method 500 terminates during step 595.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for eliminating redundant voice recognition feedback, the method comprising the steps of:

receiving a voice command inputted into a voice recognition system;

recognizing data from the voice command using the voice recognition system;

matching the recognized data with previously-received data;

determining a voice command feedback requirement based on a count of the recognized data that was previously received, wherein if the count exceeds a threshold criteria, then the feedback requirement comprises using the data to carry out the voice command without any voice feedback of the data being provided, and wherein if the count does not exceed the threshold criteria, then the feedback requirement comprises providing voice feedback that includes the data; and carrying out the feedback requirement.

2. The method of claim 1, wherein the count is a count of the number of times that the matching data was previously received.

3. The method of claim 1, wherein the count is a count of the number of sequential digits that match between the recognized data and previously-received data.

4. The method of claim 1, wherein the recognized data and the previously-received data each comprise a telephone number and wherein the determining step further comprises matching a recognized telephone number with a previously-received telephone number.

5. The method of claim 4, wherein the matching step further comprises matching all digits of the recognized telephone number with those of the previously-received telephone number.

6. The method of claim 5 wherein the count is a count of the number of times that the matching telephone number was previously-received.

7. The method of claim 4, wherein the matching step further comprises matching a portion of the digits of the recognized telephone number with a portion of the digits of the previously-received telephone number.

8. The method of claim 7, wherein the count is a count of the number of sequential digits that match.

9. A method for eliminating redundant voice recognition feedback, the method comprising the steps of:
- receiving a voice command inputted into a vehicle telematics unit;
- recognizing a telephone number from the voice command;
- comparing the recognized telephone number with one or more previously-received telephone numbers stored in the vehicle and, based on the comparison, determining a count of the recognized telephone number that was previously received; and
- based on a comparison of the count to a threshold, carrying out one of the following two steps:
  - providing confirmatory voice feedback of the recognized telephone number; or
  - dialing the recognized telephone number without providing any voice feedback of the recognized telephone number.

10. The method of claim 9, wherein the one or more previously-received stored telephone numbers is a telephone number assigned to the telematics unit.

11. The method of claim 10, wherein the telephone number assigned to the telematics unit is the telematics unit's MIN.

12. The method of claim 9, wherein comparing step further comprises:
- determining an area code of the recognized telephone number; and
- comparing the area code of the recognized telephone number with the area code of a telephone number assigned to the telematics unit.

13. The method of claim 12, wherein, if the area code of the recognized telephone number is the same as the area code of the telephone number assigned to the telematics unit, then the providing step further comprises providing voice feedback that includes all of the recognized telephone number except its area code.

14. The method of claim 9, wherein the one or more stored telephone numbers comprise a plurality of telephone numbers previously received by the telematics unit.

15. The method of claim 14, wherein the step of determining a count comprises determining if the recognized telephone number is the same as any of the previously-received telephone numbers and, if so, determining the number of times that the recognized telephone number was previously-received.

* * * * *